United States Patent [19]

Schmed

[11] Patent Number: 5,095,886
[45] Date of Patent: Mar. 17, 1992

[54] STEAM PRESSURE CONTAINER WITH A SAFETY LID

[75] Inventor: Arthur Schmed, Oberdürnten, Switzerland

[73] Assignee: Samaro Engineering-und Handels AG, Ruti, Switzerland

[21] Appl. No.: 683,987

[22] Filed: Apr. 11, 1991

[30] Foreign Application Priority Data

Apr. 30, 1990 [DE] Fed. Rep. of Germany ....... 4013817

[51] Int. Cl.$^5$ ............................................. A47J 27/06
[52] U.S. Cl. ................................. 126/377; 219/438; 220/240; 392/444
[58] Field of Search ............... 126/377, 369, 374, 389, 126/388; 220/240; 219/401, 438; 392/444

[56] References Cited

U.S. PATENT DOCUMENTS 4,362,148 12/1982 Luebke et al. ...................... 126/377

FOREIGN PATENT DOCUMENTS 1294607 3/1969 Fed. Rep. of Germany ...... 220/240
8802277 5/1988 Fed. Rep. of Germany .
2170995 9/1987 United Kingdom .

*Primary Examiner*—James C. Yeung
*Attorney, Agent, or Firm*—Tarolli, Sundheim & Covell

[57] ABSTRACT

A steam pressure container, e.g. for a coffee machine, comprises a lid incorporating a locking mechanism to ensure that the lid cannot be released or removed when the interior of the container is under pressure. The locking mechanism comprises a sealing member made of elastically resilient material and inserted into the lid. The sealing member includes a head portion with locking protrusions to ensure a non-rotatable fixing of the sealing member to the lid. The sealing member further comprises a flange portion penetrating into the flange of the container. The flange portion is provided with a sealing rib at its lowermost end and, thereabove, with a plurality of locking ribs. The latter ones cooperate with a plurality of locking grooves arranged in the inside surface of the container flange. As soon as the container is pressurized, the flange portion of the sealing member is radially deformed outwards and the locking ribs engage the locking grooves, thereby preventing an accidental rotation of the lid.

15 Claims, 4 Drawing Sheets

STEAM PRESSURE CONTAINER WITH A SAFETY LID

BACKGROUND OF THE INVENTION

1. Field of the Invention

The present invention refers to a steam pressure container with a safety lid, particularly a boiler of a steam pressure coffee machine. The container comprises an inlet opening for filling water into the container. The inlet opening is surrounded by a flange member. Further, the container has means for heating the water contained therein.

A lid member is adapted to be mounted on the flange member, whereby the lid member and the flange member have cooperating means for bringing the lid member from an open position to a sealing position and vice versa by rotation thereof around the central axis of the flange member.

Means are provided for locking the lid member in the sealing position, said means being effective as soon as the pressure in the interior of the container is greater than the ambient pressure.

Such steam pressure containers are often used in the widely known coffee brewing machines. The container is filled with water through the inlet opening and then sealed by means of the lid member before the water contained therein is heated. Usually, the container is provided with a screw-on lid member. Furthermore, an outlet conduit provided with a pressure control valve is connected to the container; as soon as a predetermined pressure is built up in the interior of the container, the heated water can escape from the container through the outlet conduit to a coffee brewing device.

In operation, considerable pressures are built up in the interior of the container. Thus, measures have to be taken that the lid member cannot be released or removed as long as there is a high pressure in the interior of the container. If in such a case the lid member would be released in an attempt to remove it, e.g. in order to refill the container with fresh water, there would be the danger that suddenly steam or hot water escapes from the container as soon as the lid member is released, with the result that the operator could be scalded.

2. Prior Art

In the British Patent No. 2,170,995 a steam pressure container having a safety lid is disclosed. The safety mechanism of this device comprises locking grooves provided in the free lower edge of the screw-on lid member and, adjacent to the flange on which the lid member is screwed-on, a piston-cylinder-assembly. The piston thereof communicates with the interior of the container and is kept in a rest position in which the lid member can be rotated by means of a spring. As soon as a certain pressure has built up in the interior of the container, the piston is displaced, against the force of the spring, such that an axially displaceable pin connected to the piston is moved towards the lid member and engages the locking grooves in the lower edge of the lid member. Thereby, the lid member is reliably prevented from being removed from the container as long as the interior of the container is pressurized, but the safety mechanism disclosed in said British Patent is not only complicated and expensive in manufacturing, but also failure-prone because the piston in the cylinder easily can be jammed, particularly if calciferous water is used.

A similar solution is disclosed in German Utility Model No. 88 02 277. The danger of a malfunction of the piston due to the calciferous water is to be eliminated by the provision of a bellows enclosing the piston-cylinder-assembly. Besides that, the design and operation of that safety mechanism is the same. However, also that mechanism is complicated and expensive in manufacturing. A further disadvantage is that the bellows is subjected to high thermal and mechanical strain resulting in a quick aging and early damage of the bellows.

OBJECTS OF THE PRESENT INVENTION

It is an object of the present invention to provide a steam pressure container having a safety lid member which does not have the disadvantages of the devices known in the prior art.

Particularly it is an object of the present invention to provide a steam pressure container having a safety lid member which is simpler in design and, particularly, does not include movable parts mounted on the pressure container itself.

It is a still further object of the present invention to provide a steam pressure container having a safety lid member which reliably prevents a release or removal of the lid member from the container as long as the container is pressurized during an extended period of operation and without any servicing.

SUMMARY OF THE INVENTION

According to the invention, there is provided a steam pressure container with a safety lid, particularly a boiler of a steam pressure coffee machine. The container has an inlet opening for filling water into the container. The inlet opening is surrounded by a flange member. Further, the container has means for heating the water contained therein. The means for heating the water may be a conventional heating coil.

A lid member is provided and adapted to be mounted on the flange member. The lid member and the flange member have cooperating means for bringing the lid member from an open position to a sealing position and vice versa by rotation thereof around the central axis of the flange member.

Means for locking the lid member in the sealing position are effective as soon as the pressure in the interior of the container is greater than the ambient pressure. The means for locking the lid member comprise a sealing member made of elastically resilient material and mounted in the interior of the lid member, said sealing member comprising means for non-rotatably securing it in the interior of the lid member and further comprising a flange portion projecting into the interior of the flange member of the container when the lid member is mounted on the flange member.

The flange portion is provided with a circumferential sealing rib and with circumferentially arranged first locking members located above the circumferential rib and the flange member of the container is provided with second locking members arranged along the inner peripheral surface thereof. The first locking members provided on the flange portion are elastically deformed as soon as the pressure in the interior of the container is greater than the ambient pressure such that the first locking members provided on the flange portion and the second locking members provided on the flange member lockingly engage each other to prevent a rotation of the lid member from its sealing position to its open position.

Thus, the means for locking the lid member are constituted essentially by an elastically resilient sealing member located in the interior of the lid member. Such a sealing member is anyway necessary for sealing the container in a gas-tight manner. The container itself does not comprise any movable parts; only the inner circumferential surface of the flange member has to be provided with the aforementioned locking means, e.g. in the form of grooves.

According to a preferred embodiment, the circumferential sealing rib is radially outwardly biased such that it is pressed against the inner surface of the flange member of the container when the lid member is mounted on the flange member of the container before the interior of said container is pressurized. Thereby, the required pressure difference between the interior of the container and the atmosphere can be established easier and quicker whereby the engagement of the first and second locking means is facilitated.

Furthermore, preferably there is provided a chamber between the inner surface of the flange member of the container and the flange portion of the sealing member. This chamber is sealed against the interior of the container by the circumferential rib and open to the atmosphere. Thereby the mutual engagement of the first and second locking means is considerably facilitated due to the more pronounced pressure difference between the interior of the container and said chamber.

In order to ensure a simple mounting of the sealing member in the lid member with simultaneous locking of the sealing member in the lid member against rotation, the sealing member comprises a head portion having generally circular shape, said head portion being provided with one or with a plurality of locking protrusions projecting from the upper face of said head portion. Thereby, the lid member comprises a plurality of recesses, the locking protrusion engaging the recesses when the sealing member is mounted in the lid member to prevent a rotational movement of the sealing member with reference to the lid member.

In order to simply establish a communication between the aforementioned chamber with the atmosphere, the diameter of the head portion of the sealing member can be less than the inner diameter of the flange member of the container.

In order to ensure that the sealing member cannot fall out of the lid member, locking protrusions provided on the head portion also radially project over the periphery of the head portion. Thereby, the lid member is provided with an inner circumferential groove, said locking protrusions engaging the circumferential groove when the sealing member is mounted in said lid member.

A friction-less locking against rotation can be achieved when the recesses in the lid member correspond in shape and configuration to the protrusions on the surface of the head portion of the sealing member.

The flange portion of the sealing member can be of generally cylindrical shape and integrally connected to the head portion of the sealing member along its upper circumferential edge. The circumferential sealing rib preferably is located at the free circumferential edge of the flange portion remote from the head portion. Thereby, an easy to manufacture, one-piece design of head portion, flange portion and sealing rib can be realized.

In order to ensure an easy inserting of the flange portion into the mouth of the flange member, the flange portion of the sealing member can be conically shaped and integrally connected to the head portion of the sealing member along its upper circumferential edge. The circumferential sealing rib can be located at the free circumferential edge of the flange portion remote from the head portion, and the diameter of the flange portion continuously decreases from the upper edge near the head portion towards the free edge having the circumferential rib.

According to a preferred embodiment of the invention, the first locking members comprise a plurality of outwardly projecting ribs arranged on the outer surface of the flange portion of the sealing member and running parallel to the central axis of the flange member, and the second locking members comprise a plurality of grooves arranged on the inner surface of the flange member of the container and running parallel to the central axis of the flange member. Thereby, the greatest possible effect of the forces created by the high pressure inside the container is achieved and a reliable locking against rotation of the lid member ensured.

Preferably, the width of the grooves is somewhat greater than the width of the ribs in order to ensure that the ribs always positively engage the grooves. If the ribs and the grooves are equidistantly arranged over the circumference of the flange portion and the inner surface of said flange member, respectively, it is ensured that as much ribs as possible can engage a groove. This effect can be further increased when the number of the grooves provided on the flange member is an integer multiple of the number of ribs provided on the flange portion.

If the head portion of the sealing member comprises a circular groove arranged at the transition of the flange portion to the head portion, the flange portion can be designed more flexible with respect to the head portion. A further improvement regarding the flexibility can be achieved, when the head portion of the sealing member comprises a central pot-shaped portion, the bottom thereof extending essentially in the level of the lower circumferential edge of the flange portion.

BRIEF DESCRIPTION OF THE DRAWINGS

In the following, a steam pressure container with a safety lid member is further described in connection with a pressure vessel for a steam pressure coffee machine. However, it is understood that the steam pressure container with safety lid member is usable for nearly every kind of other pressure vessels, if required with slight modifications which, however, are within the scope of a person skilled in the art.

In the description hereinafter, reference is made to the accompanying drawings, in which.

DETAILED DESCRIPTION OF PREFERRED EMBODIMENTS

Figure 1:
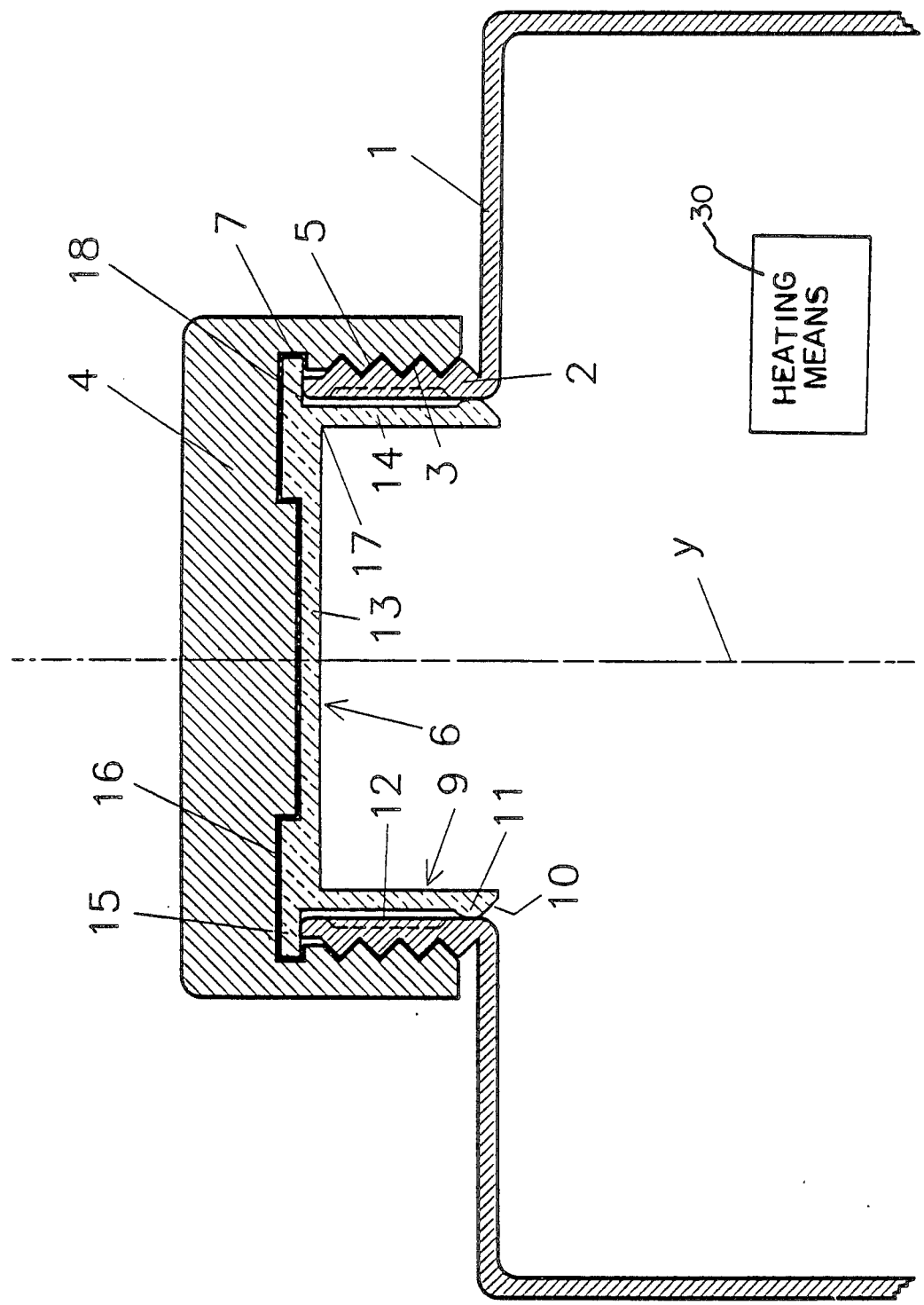
FIG. 1 shows a partial axial sectional view of a steam pressure vessel with a safety lid member in a pressureless condition.

As can be seen from FIG. 1, the steam pressure container 1 (only a small part thereof being shown) comprises a flange member 2 surrounding an inlet opening through which water can be filled into the container 1. A heating means 30 such as a conventional heating coil is located in the container 1 for, when connected to an energy source, heating the water contained in the container 1. The flange member 2 has generally cylindrical shape and is provided with an outer thread 3. A lid member 4 serves to seal the steam pressure container 1 and is provided with an inner thread 5 corresponding to the outer thread 3 provided on the flange member 2. Thus, the lid member 4 can be screwed on the flange member 2.

The lid member 4 is provided with a sealing member, generally designated with reference numeral 6, which is loosely inserted into the interior of the lid member 4 and which is kept in place in the interior of the lid member 4 by means of a peripheral groove 7 provided in the lid member 4.

Figure 3:
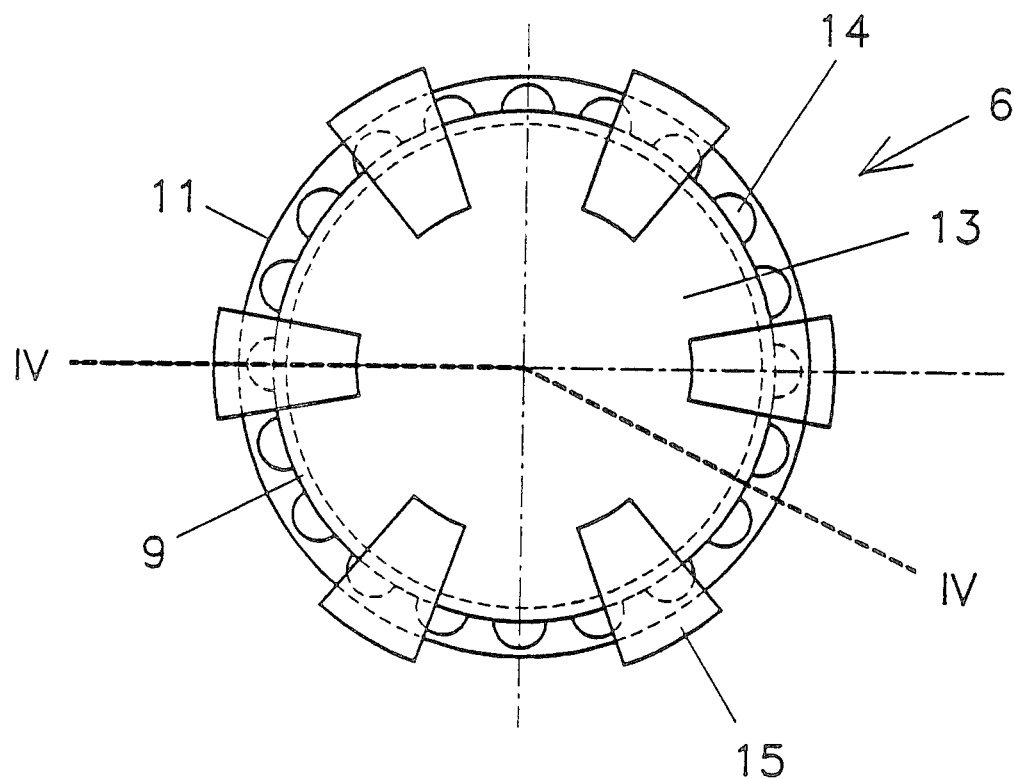
FIG. 3 shows a top view of the sealing member.
Figure 4:
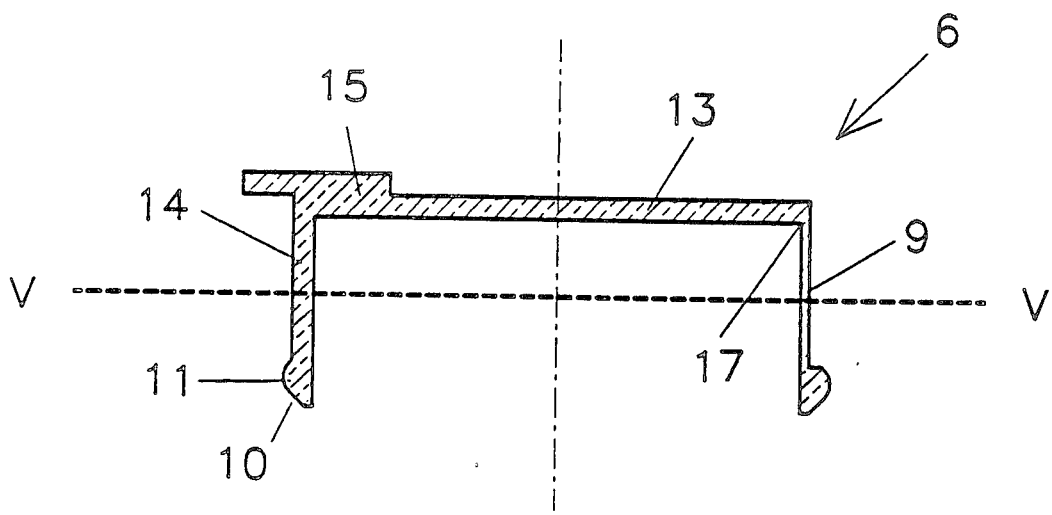
FIG. 4 shows an axial sectional view of the sealing member, taken along the line IV—IV in FIG. 3.

The sealing member 6 is made of elastically resilient material, e.g. of rubber, neoprene or a similar useful synthetic material. It comprises a head portion having the general shape of a flat disc 13 which is, in the present example, of circular configuration. The shape of the disc 13 can be more clearly seen in FIGS. 3 and 4. Further, the sealing member 6 comprises a flange portion 9 having generally cylindrical shape and being connected to said flat disc shaped head portion 13. It is understood that said flange portion preferably may be integrally formed onto said flat disc shaped head portion 13. The flange portion 9 has a somewhat smaller outer diameter than the inner diameter of the flange member 2 of the steam pressure container 1; thus, the lid member 4 with inserted sealing member 6 can easily be mounted on the flange member 2 of the steam pressure container.

In the region of the free circumferential edge 10 of the flange portion 9, there is provided a peripheral sealing rib 11 projecting outwards from the surface of the flange portion 9. The peripheral edge of the sealing rib 11 is adapted to be pressed against the inner surface of the flange member 2 of the steam pressure container 1. Preferably, the design of the sealing member 6 and/or of the flange member 2 is such that the sealing rib 11 is biased against the inner surface of the flange member 2 of the steam pressure container 1 when the lid member 4 is mounted on the flange member 2. For instance, this can be realized by designing the inner surface of the flange member slightly conical, with decreasing diameter from the top to the bottom of the flange member 2. In order to facilitate the insertion of the sealing member 6 into the flange member 6 and, thereby, to facilitate the mounting of the lid member 4 on the steam pressure container 1, the free lower edge 10 of the cylindrical flange portion 9 can be provided with a conical shape, with a decreasing diameter towards the free end of the flange portion 9.

Figure 5:
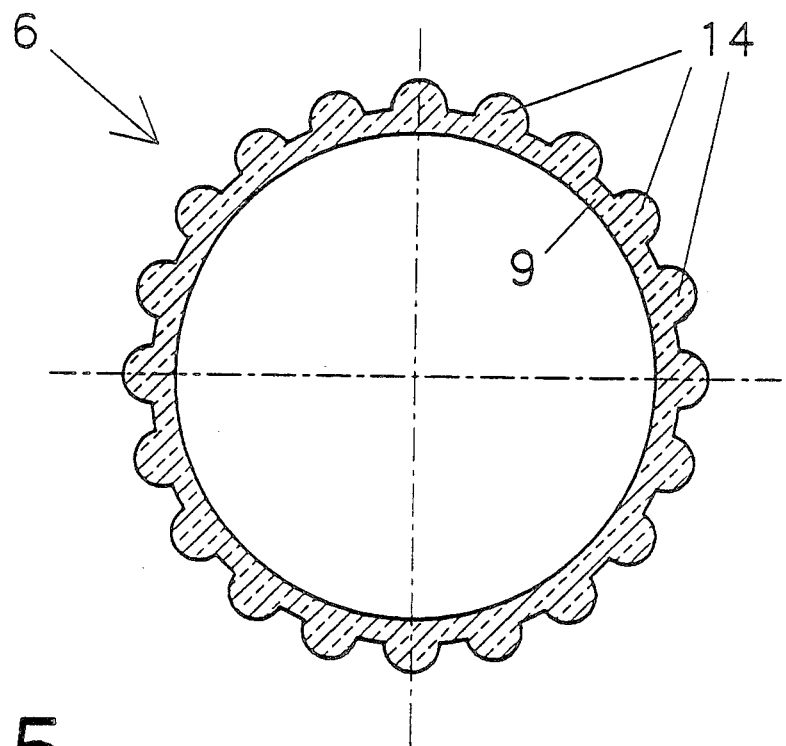
FIG. 5 shows a cross sectional view of the sealing member, taken along the line V—V in FIG. 4.

The inner surface of the flange member 2 is provided with a number of grooves 12 which are arranged over the circumference of the flange member 2 and which run parallel to each other and parallel to the central axis y of the flange member 2. These grooves 12 extend over a part of the total height of the flange member 2, essentially over a height which begins at the transition zone of the flange portion 9 into the head portion 13 of the sealing member 6 and which ends just in top of the sealing rib 11 of the flange portion 9 of the sealing member 6. The flange portion 9 is provided with a number of locking ribs 14 arranged over the outside surface of the flange portion 9 and running parallel to each other and parallel to the central axis y of the flange member 2 of the steam pressure container. These locking ribs 14 are adapted to cooperate with the grooves 12 provided in the inner surface of the flange member 2. The locking ribs project to a somewhat less extent over the surface of the flange portion 9 than the sealing rib 11. This can be seen particularly in FIGS. 3 and 5.

The width of the grooves 12 in the inner peripheral surface of the flange member 2 of the steam pressure container 1 essentially corresponds to the width of the locking ribs 14 on the outside of the cylindrical flange member 9 of the sealing member 6, or is larger by a small amount. It is recommended to provide a relatively large number of locking ribs 14 in order to ensure a locking of the lid member 4, as will be described in detail hereinafter, in essentially any arbitrary rotational position of the lid member 4. In the present embodiment, as shown in the drawings, a total of twenty locking ribs 14 is provided; this number should be sufficient in most cases. The number of the grooves 12 in the inner surface of the flange member 2 of the steam pressure container 1 can correspond to the number of the locking ribs 14; however, in any case, it is preferable if the number of the grooves 12 and the number of the locking ribs 14 are in an integral relation to each other.

An other possibility consists in providing only a few, e.g. four or six locking ribs 14 which cooperate with selected ones of a greater number of grooves 12 provided in the inner surface of the flange member 2 of the steam pressure container In order to ensure a locking of the lid member 4 against rotation by the cooperation of the locking ribs 14 with the grooves 12, as will be explained in more detail hereinafter, if the interior of the steam pressure container 1 is pressurized, it is essential that the lid member 4 cannot be rotated in relation to the sealing member 6. To achieve this goal, the head portion 13 of the sealing member 6 is provided with locking protrusions 15. As can be seen particularly in FIG. 3, the locking protrusions 15 consist of tabs integrally formed onto the head portion 13 of the sealing member 6. The tabs 15, on the one hand, project over the top surface of the head portion 13 of the sealing member 6 and, on the other hand, over the periphery thereof. Depending on the material of the sealing member 6 and also depending on the size of the sealing member 6 and the size of the lid member 4, respectively, a greater or smaller number of such tabs 15 can be provided; in the embodiment shown in FIG. 3, six of such tabs 15 are provided.

The locking protrusions or tabs 15 on the one hand, engage with their outer edge portion the previously mentioned groove 7 provided in the lid member 4 in order to keep the sealing member 6 in the interior of the lid member 4 in place and to prevent that it falls out of the lid member 4. On the other hand, the lid member 4 is provided in the inner surface of its top portion with a number of recesses 16 which correspond to the locking protrusions or tabs 15 as far as the number and the shape is concerned. Thereby, a positive non-rotational connection is ensured between the sealing member 6 and the lid member 4.

According to FIG. 1, the steam pressure container 1 is shown in pressure-less condition, the lid member being mounted on the flange member 2 of the container 1. The sealing rib 11 abuts against the inner surface of the flange member 2 below the grooves 12 and seals the interior of the steam pressure container 1 against the atmosphere. As the remaining parts of the sealing member 6 do not contact neither the flange member 2 nor the lid member 4 over their entire surface, only the sealing rib 11 is responsible for sealing the interior of the container 1. Even if the impression could develop in studying FIG. 1 that a further sealing function is performed by the cooperation of the head portion 13, the lid member 4 and the upper edge of the flange member 2, this is not true as only the portions of the tabs 15 projecting over the periphery of the head portion 13 of the sealing member 6 rest on the upper edge of the flange member 2. Thereby, the chamber 18 between the flange portion 9 of the sealing member 6 and the inner surface wall of the flange member 2 of the container 1 is communicating with the atmosphere.

Figure 2:
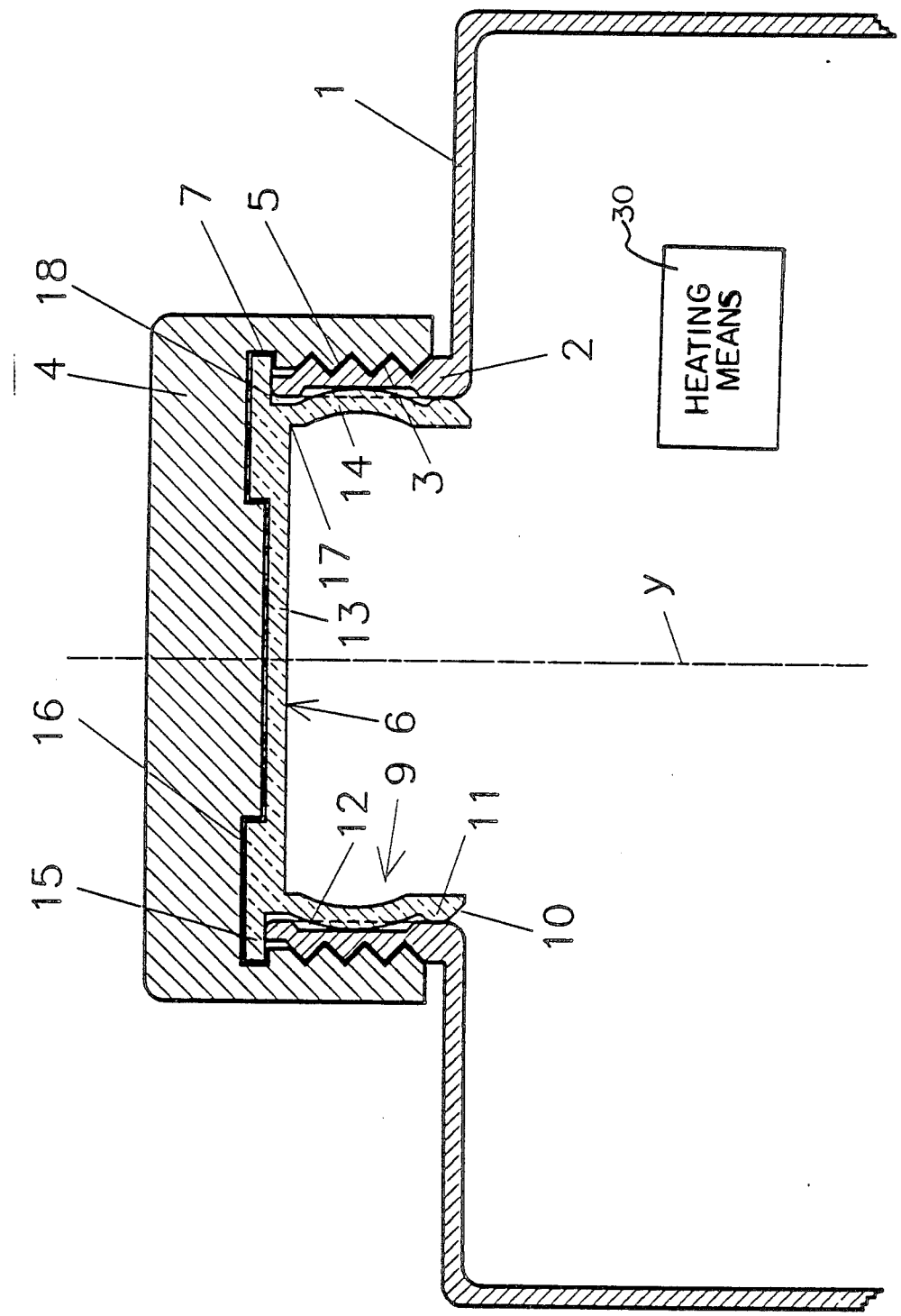
FIG. 2 shows a corresponding view as in FIG. 1, but the interior of the container being under pressure.

As can be seen from FIG. 2, the central region of the flange portion 9 of the sealing member is radially deformed towards the flange member 2 of the container 1 as soon as the pressure in the interior of the container 1 is built up. No resistance is put against such deformation since, as already mentioned, no sealing is performed above the sealing rib 11 with the result that the air enclosed in the chamber 18 between the flange portion 9 of the sealing member 6 and the interior of the flange member 2 of the container 1 can escape. Due to the aforementioned radial deformation of the flange portion 9, the locking ribs 14 engage the locking grooves 12 provided in the inner surface of the flange member 2 of the container 1. A rotation of the lid member 4 is thereby prevented since the sealing member 6 is pressed against the lid member 4 with its head portion 13 and particularly since the locking protrusions 15 are pressed into the recesses 16 provided in the lid member 4. The greater the pressure difference between the interior of the container 1 and the atmosphere is, the stronger is the effect of the explained positive locking with the result that the lid member 4 cannot be rotated to be removed from the steam pressure container without destruction as long as the interior of the container 1 is pressurized.

As previously explained, the sealing member 6 is made of an elastically resilient material. This means that the central region of the flange portion 9 of the sealing member 6 moves back into its initial position shown in FIG. 1 as soon as the pressure in the interior of the container 1 is sufficiently low, with the result that the positive engagement between the ribs 14 and the grooves 12 is released and the lid member 4 may be rotated to open the container 1.

The reliable operation of the locking mechanism can be supported by designing the head portion 13 of the sealing member 6 with a smaller diameter than the interior diameter of the flange member 2. Thereby, no sealing occurs at the upper edge of the flange member 2 of the container 1 and no significant resistance is put up against the radial deformation of the central region of the flange portion 9 of the sealing member 6.

Figure 6:
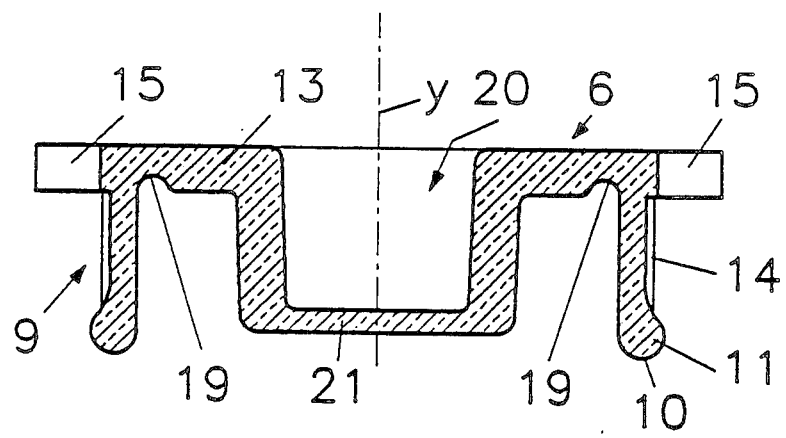
FIG. 6 shows a cross sectional view of a sealing member according to a further embodiment.

A further embodiment of the sealing member is shown in FIG. 6 in a cross-sectional view. Generally, the design of this embodiment corresponds to the design of the sealing member 6 shown in FIGS. 1-5. However, according to FIG. 6, the sealing member 6 is provided with a circumferential groove 19 located in the transition zone from the flange portion 9 to the head portion 13. Thereby, the flange member 9 is more flexible in relation to the head portion 13 with the result that the sealing effect is improved. Furthermore, the central head portion 13 located within the flange portion 9 comprises a pot-shaped portion 20. The bottom 21 of the pot-shaped portion 20 extends essentially in the level of the lower circumferential edge 10 of the flange portion 9. By this measure, the flexibility of the flange portion 9 is further increased.

It is understood that in place of the parallely running locking ribs 14 on the outside of the cylindrical flange portion 9 and the parallely running locking grooves 12 in the inner surface of the flange member 2 differently shaped locking means can be provided which are adapted to cooperate with each other. Furthermore, it is possible to realize the non-rotational locking of the sealing member 6 in the lid member 4 in another way, e.g. by avoiding the provision of the recesses 16 and by designing the circumferential groove 7 in the lid member 4 with alternating different radii whereby the end portion of the locking protrusions 15 engage the thereby realized radial recesses.

Finally, it should be mentioned that there exists the possibility of a kinematic reversal of the locking mechanism: Instead of providing the flange portion 9 with ribs 14 and the inner surface of the flange member 2 with grooves 12, the outer surface of the flange portion 9 can be provided with locking grooves and the inner surface of the flange member 2 can be provided with locking ribs. As soon as the interior of the container is sufficiently pressurized, the same locking effect as hereinbefore described is realized.

What is claimed is:

1. A steam pressure container with a safety lid, particularly a boiler of a steam pressure coffee machine, comprising:

a container means having an inlet opening for filling water into the container, said inlet opening being surrounded by a flange member;

said container having means for heating the water contained in said container;

a lid member adapted to be mounted on said flange member, said lid member and said flange member having cooperating means for bringing said lid member from an open position to a sealing position and vice versa by rotation thereof around the central axis of said flange member;

means for locking said lid member in the sealing position, said means being effective as soon as the pressure in the interior of said container is greater than the ambient pressure;

said means for locking said lid member comprising a sealing member made of elastically resilient material and mounted in the interior of said lid member;

said sealing member comprising means for non-rotatably securing it in the interior of said lid member and further comprising a flange portion projecting into the interior of said flange member of said container when said lid member is mounted on said flange member;

said flange portion being provided with a circumferential sealing rib and with circumferentially arranged first locking members located above said circumferential rib;

said flange member of said container being provided with second locking members arranged along the inner peripheral surface of said flange member;

said first locking members provided on said flange portion being elastically deformed as soon as the pressure in the interior of said container is greater than the ambient pressure such that said first locking members provided on said flange portion and said second locking members provided on said flange member lockingly engage each other to prevent a rotation of said lid member from its sealing position to its open position.

2. A steam pressure container according to claim 1 in which said circumferential sealing rib is radially outwardly biased such that it is pressed against the inner surface of said flange member of said container when said lid member is mounted on said flange member of said container before the interior of said container is pressurized.

3. A steam pressure container according to claim 1 in which there is provided a chamber between the inner surface of said flange member of said container and said flange portion of said sealing member, said chamber being sealed against the interior of said container by said circumferential rib and being open to the atmosphere.

4. A steam pressure container according to claim 1 in which said sealing member comprises a head portion having generally circular shape, said head portion being provided with one or with a plurality of locking protrusions projecting from the upper face of said head portion, and in which said lid member comprises a plurality of recesses, said protrusion engaging said recesses when said sealing member is mounted in said lid member to prevent a rotational movement of said sealing member with reference to said lid member.

5. A steam pressure container according to claim 4 in which the diameter of said head portion of said sealing member is less than the inner diameter of said flange member of said container.

6. A steam pressure container according to claim 4 in which said locking protrusions provided on said head portion also radially project over the periphery of said head portion, and in which said lid member is provided with an inner circumferential groove, said locking protrusions engaging said circumferential groove when said sealing member is mounted in said lid member.

7. A steam pressure container according to claim 4 in which said recesses in said lid member correspond in shape and configuration to said protrusions on the surface of said head portion of said sealing member.

8. A steam pressure container according to claim 4 in which said flange portion of said sealing member is of generally cylindrical shape and being integrally connected to said head portion of said sealing member along its upper circumferential edge, said circumferential sealing rib being located at the free circumferential edge of said flange portion remote from said head portion.

9. A steam pressure container according to claim 8 in which said head portion of said sealing member comprises a circular groove arranged at the transition of the flange portion to the head portion.

10. A steam pressure container according to claim 8 in which said head portion of said sealing member comprises a central pot-shaped portion, the bottom thereof extending essentially in the level of the lower circumferential edge of said flange portion.

11. A steam pressure container according to claim 4 in which said flange portion of said sealing member is conically shaped and being integrally connected to said head portion of said sealing member along its upper circumferential edge, said circumferential sealing rib being located at the free circumferential edge of said flange portion remote from said head portion, and the diameter of said flange portion continuously decreasing from said upper edge near said head portion towards said free edge having the circumferential rib.

12. A steam pressure container according to claim 1 in which said first locking members comprise a plurality of outwardly projecting ribs arranged on the outer surface of said flange portion of said sealing member and running parallel to the central axis of said flange member, and in which said second locking members comprise a plurality of grooves arranged on the inner surface of said flange member of said container and running parallel to the central axis of said flange member.

13. A steam pressure container according to claim 12 in which the width of said grooves is somewhat greater than the width of said ribs.

14. A steam pressure container according to claim 12 in which said ribs and said grooves are equidistantly arranged over the circumference of said flange portion and said inner surface of said flange member, respectively.

15. A steam pressure container according to claim 14 in which the number of said grooves provided on said flange member is an integer multiple of the number of ribs provided on said flange portion.

* * * * *